United States Patent
Vesterinen et al.

(10) Patent No.: US 7,974,311 B2
(45) Date of Patent: Jul. 5, 2011

(54) CONFIGURING ADDRESSES IN A COMMUNICATION NETWORK

(75) Inventors: Seppo Vesterinen, Oulunsalo (FI); Tomi Tarvainen, Espoo (FI)

(73) Assignee: Spyder Navigations L.L.C., Wilmington, DE (US)

( * ) Notice: Subject to any disclaimer, the term of this patent is extended or adjusted under 35 U.S.C. 154(b) by 2277 days.

(21) Appl. No.: 10/774,576

(22) Filed: Feb. 10, 2004

(65) Prior Publication Data

US 2005/0174998 A1    Aug. 11, 2005

(51) Int. Cl.
*H04J 3/24* (2006.01)

(52) U.S. Cl. ........ 370/475; 370/338; 370/389; 370/410; 370/465; 455/561

(58) Field of Classification Search .................. 370/349, 370/338, 393, 401, 400, 392, 354, 475, 410, 370/389, 465; 455/550, 561
See application file for complete search history.

(56) References Cited

U.S. PATENT DOCUMENTS

| | | | | |
|---|---|---|---|---|
| 7,158,776 B1 * | 1/2007 | Estes et al. | ..................... | 455/411 |
| 7,333,461 B2 * | 2/2008 | Thubert et al. | ................. | 370/338 |
| 7,450,560 B1 * | 11/2008 | Grabelsky et al. | ............. | 370/352 |
| 2002/0039357 A1 * | 4/2002 | Lipasti et al. | .................. | 370/338 |
| 2002/0080752 A1 * | 6/2002 | Johansson et al. | ............. | 370/338 |
| 2003/0099246 A1 * | 5/2003 | Cox et al. | ........................ | 370/400 |
| 2003/0165230 A1 * | 9/2003 | Reuss | ....................... | 379/265.02 |
| 2003/0195002 A1 * | 10/2003 | Singhal et al. | ................. | 455/436 |
| 2004/0042446 A1 * | 3/2004 | Koch et al. | ...................... | 370/352 |
| 2004/0132451 A1 * | 7/2004 | Butehorn et al. | .............. | 455/445 |
| 2004/0151135 A1 * | 8/2004 | Kitahama et al. | .............. | 370/328 |
| 2004/0179508 A1 * | 9/2004 | Thubert et al. | ................. | 370/349 |
| 2004/0198413 A1 * | 10/2004 | Smith et al. | ................ | 455/550.1 |
| 2004/0258005 A1 | 12/2004 | Kitawaki | | |

OTHER PUBLICATIONS

T. Narten, et al., "Privacy Extensions for Stateless Address Autoconfiguration in IPv6", Jan. 2001, Network Working Group: RFC 3041, retrieved from the internet http://www.faqs.org/ftp/rfc/pdf/rfc3041.txt.pdf, pp. 1-17.

* cited by examiner

*Primary Examiner* — Simon Sing
*Assistant Examiner* — Simon King (57) ABSTRACT

The present invention relates to a method for configuring addresses in a packet switched data communication system. The method comprises providing a logical network with at least two network elements, a network element comprising at least one sub-element. The method further comprises configuring a temporary address for an interface of a sub-element, retrieving an identifier of the network element and defining an address for the interface of the sub-element by including the identifier of the network element to the temporary address.

31 Claims, 7 Drawing Sheets

CONFIGURING ADDRESSES IN A COMMUNICATION NETWORK

FIELD OF THE INVENTION

The invention relates to communication systems, and more particularly to configuring addresses in a packet switched communication system for communication network elements, such as telecommunication equipment.

BACKGROUND OF THE INVENTION

A communication system can be seen as a facility that enables communications between two or more entities such as user equipment and/or other network elements, also called nodes, associated with the communication system. A communication system typically operates in accordance with a given standard or specification which sets out what the various entities associated with the communication system are permitted to do and how that should be achieved.

Examples of communication systems may include fixed communication systems, such as a public switched telephone network (PSTN), wireless communication systems, such as a public land mobile network (PLMN), and/or other communication networks such as an Internet protocol (IP) transport network and/or other packet switched data networks. Various communication systems may simultaneously be concerned in a connection.

Wireless communication systems include various cellular or otherwise mobile communication systems using radio frequencies for sending voice or data between stations, such as user equipment (UE) (e.g. mobile stations, MS) and base transceiver stations (BTS), also called base stations. Examples of mobile communication systems are the global system for mobile communications (GSM), general packet radio service (GPRS) and the so-called third generation (3G) mobile communication systems, such as the universal mobile telecommunications system (UMTS) terrestrial radio access network (UTRAN).

An example of the IP transport network is the Internet, which is a global network formed by the interconnection of numerous smaller networks all adapted to use the Internet protocols, such as the Internet Protocol (IP) and the Transmission Control Protocol (TCP), and a common address structure. In addition to said protocols, the IP transport network may include a number of auxiliary protocols, such as the address resolution protocol (ARP), open shortest path first (OSPF) and Internet control message protocol (ICMP). The IP transport network provides transfer of data in links provided between nodes, i.e. hosts and routers, within and between the smaller networks.

The IP network operates according to a principle of layered communication, where lower layers serve upper layers and adjacent layers communicate over an interface. An example of a layered communication model is the Open System Interface (OSI) reference model. The layers of the OSI reference model may be called the physical layer (the first layer), the data link layer (the second layer), the network layer (the third layer), the transport layer (the fourth layer) and the application layer (the fifth layer).

The data link layer (i.e. the second layer, L2) controls data flow, handles transmission errors, provides physical addressing and manages access to the physical medium. In the data link layer, data link layer devices, such as bridges and switches, take care of these functions. The data link layer may use Ethernet protocol, for example.

The network layer takes care of routing, i.e. determining optimal routing paths and transferring the data packets over the IP network from an originating party, i.e. source host, to a terminating party, i.e. destination host. In determining optimal routing paths, the network layer may use routing algorithms and routing tables. A routing path typically goes through routers. The network layer transfers information using so-called protocol address of the terminating party in determining the physical addresses of the routers along the routing path. In the network layer, the IP version 4 protocol (IPv4) or the IP version 6 protocol (IPv6) may be used. Other protocols may also be used. Examples of such protocols may include the IPX, NetBIOS, DECnet, SNA, AppleTalk and so on.

In an IP network each node, including hosts and routers, has an address, which is unique for the element. The Internet Engineering Task Force (IETF) has developed an addressing architecture of the IP for assigning identifiers for node interfaces. A single interface of a node has at least one IP address, but may have multiple IP addresses as well.

Both the IPv4 and the IPv6 provide a structure for defining the IP addresses. The IPv4 defines addresses of 32 bits and the IPv6 increases the address size to 128 bits. The IP address consists of two parts: the network portion and the host portion. The network portion identifies the network to which the node is connected and may also be called a subnet prefix. The host portion identifies the host in the network, or in other words, the interface on which the host is attached to the link. In the IPv6, the host portion is called as an interface identifier (interface ID).

In the IPv4, the number of addresses is limited and a careful address planning is needed. Gateways (i.e. IP Routers) are typically used to create addressing structure where a private network has an independent private address space (intranet) and only a limited amount of public addresses. The DHCP (Dynamic Host Configuration Protocol) is applied usually for autoconfiguring IP addresses and other network settings to the IPv4 hosts.

In the IPv6, there are much more available IP addresses than in the IPv4. An IPv6 address consists of 64-bit long prefix portion and 64-bit long interface ID portion. The IPv6 incorporates also site-locally and link-locally scoped addresses in addition to the globally routable addresses. Site-locally scoped addresses are used for communications inside private networks as these addresses shall not route outside the defined boundary. Link-locally scoped addresses are used for communications between nodes that are connected to the same link i.e. a medium over which nodes can communicate at the link layer. Example of such a link is a simple or bridged Ethernet. An IPv6 node may assign to its interface IPv6 addresses with multiple scopes depending on its communication needs with other nodes that may reside in the same link, site, or in some other public IPv6 network. The scoped IPv6 addresses are formed so that the same interface ID portion is joined with different prefix portions that are defined for each scope.

In the IPv6, an address autoconfiguration process is provided for multicast-capable links. In the autoconfiguration, a node, i.e. a host or a router, generates a preliminary, also called tentative, link-local address by appending the interface ID to a known link-local prefix. An address is tentative until its uniqueness is verified. The node verifies the uniqueness of the tentative link-local address by making enquiries in the neighboring nodes. If the verification shows that the tentative address is unique, said address is assigned to the interface. If the verification shows that the address is already used by another node, there may be an alternative interface ID to be tried or a manual configuration may be required. A host may then receive further information from a router and may continue its autoconfiguration based on this information.

Figure 1:
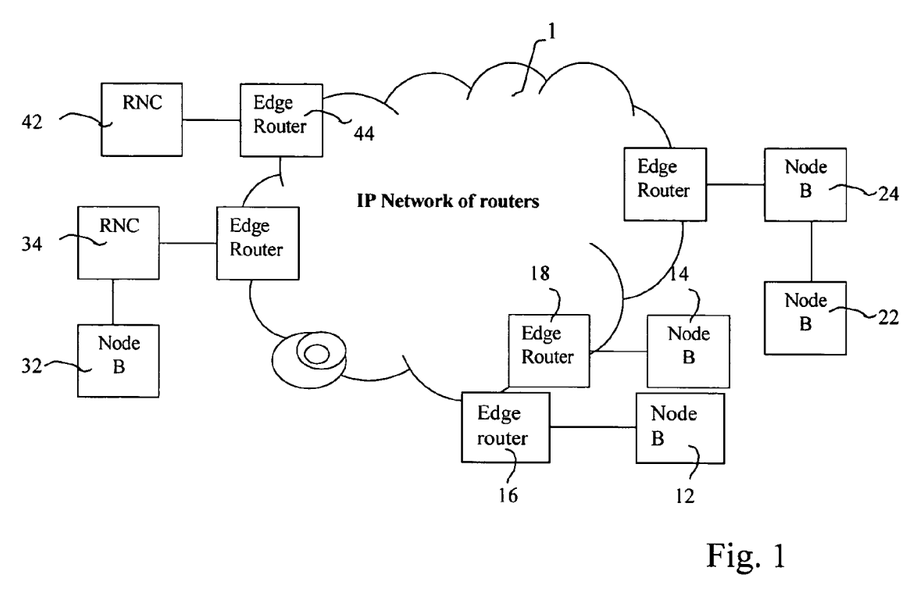
FIG. 1 shows an example of architecture for an IP transport network in which embodiments of the invention may be implemented.

The mobile communication networks as defined by the third generation partnership project (3GPP) are expected to apply IP transport option in radio access networks (RAN), for example in the UTRAN. FIG. 1 shows an exemplifying architecture for the IP transport network 1, i.e. IP network of routers, as defined by the 3GPP. A router 16, 18, 44 connecting a host, such as a transceiver network element, e.g. a Node B 12, 14, or a controller network element, e.g. radio network controller (RNC) 42, to the IP network 1 may be called an Edge Router. Typically, each Node B and RNC 12, 14, 42 needs its own router 16, 18, 44 to connect the Node B 12, 14 and the RNC 42 with the IP network 1. In some cases, two or more network elements, such as two or more transceiver network elements, such as two or more Node Bs 22, 24, or a transceiver network element, such as a Node B 32, and a controller network element, such as a RNC 34, may be directly connected to each other with a point-to-point link. This connection takes no benefit from the IP infrastructure and no intermediate router is needed between the two transceiver network elements 22, 24 or 32, 34. Each network element remains an individual IP node.

It shall be appreciated that FIG. 1 is only an example of a simplified IP transport network. The number, type and order of the entities may differ substantially from the shown. It shall also be appreciated that the terms used in the context of FIG. 1 refer to the 3G mobile communication system as defined by the 3GPP. In the second generation (2G) mobile communication systems, such as the GSM, the transceiver network element is typically called a base transceiver station (BTS) or simply base station and a controller network element is typically called a base station controller (BSC).

Figure 2:
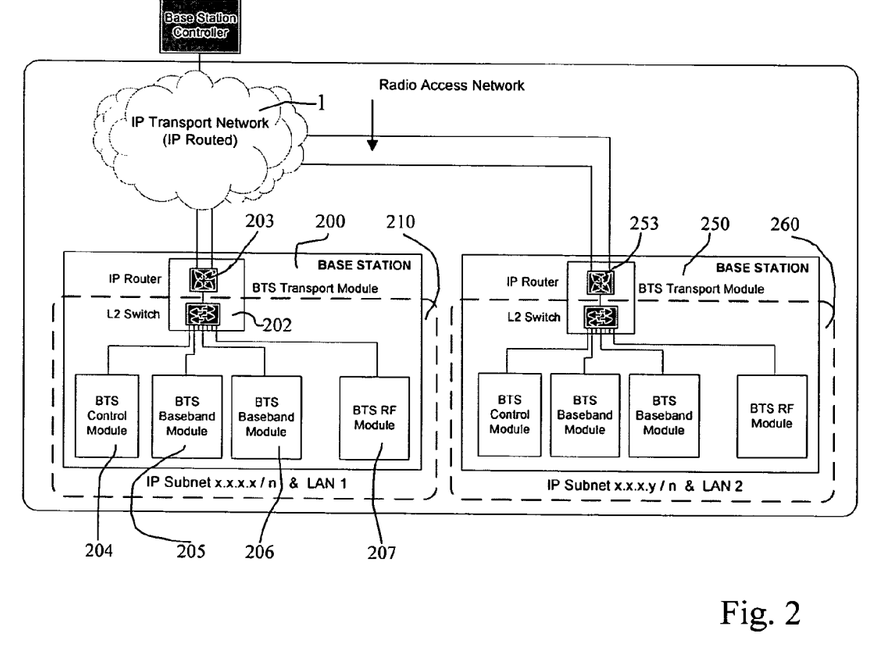
FIG. 2 shows multiple base stations connected to the IP transport network according to an implementation of the prior art.

When IP transport is applied in the radio access network, it is obvious that the base stations become IP nodes that may build up an internal local area network (LAN), based for example on the Ethernet protocol. This is shown in FIG. 2, where a base station node 200 is build of multiple base station modules each comprising an IP host connected to the internal LAN 210 of the base station node. The base station node 200 may be a telecommunication equipment comprising a cabinet housing multiple base station hardware modules 204, 205, 206, 207 that together implement for example the Node B functionality according to the 3GPP specifications. The base station modules may typically be replaceable plug-in units. The base station node may sometimes be also called a base station cabinet as often a logical base station fits into a single physical equipment, i.e. the cabinet.

The FIG. 2 arrangement is similar to the ensemble of Node Bs 12, 14 and Edge Routers 16, 18 of FIG. 1 corresponding to the base station nodes 200, 250 and IP routers 203, 253 of FIG. 2, respectively. As shown in FIG. 2, the IP router 203 as a network layer forwarding device separates, or isolates the base station internal IP subnet and Ethernet LAN from other networks, such as the external IP transport network, all the traffic that happens just between the base station internal modules. Therefore, instead of using globally unique Ethernet addresses, the base station modules may assign dynamically (autoconfigure) locally scoped Ethernet addresses to be used for the base station internal communications at the link layer.

One physical transport module of the base station may include both the IP router and L2 switch functions. Alternatively, the IP router function may be implemented by a separate, base station external physical device, into which the base station is connected. In such a case, the transport module may contain only the L2 switch function.

One of the base station modules is a transport module 202 connected with an IP router 203 and connecting the base station internal LAN 210 to the external IP transport network 1 of the radio access network (e.g. UTRAN). The IP router 203 provides a default gateway function to the base station modules 204, 205, 206, 207 comprising IP hosts. The internal LAN 210 of the base station node 200 forms a single IP subnet configured in the IP router 203 and the base station modules 204, 205, 206, 207 share the same IP subnet prefix for communicating outside the internal LAN 210. As several base station modules may be included in each base station node, and each base station module may represent one or more IP hosts, a base station node as a network element may require easily tens of Ethernet and IP addresses.

If two or more base station nodes 200, 250 need to be connected to the IP transport network 1, each base station node 200, 250 needs an IP router 203, 253, as shown in FIG. 2. Each base station node 200, 250 thus forms its own internal LAN 210, 260 and has its own IP subnet prefix.

The amount of required IP subnets increase when all the base station nodes are interconnected using an IP routed network. In the FIG. 1 architecture, each Node B represents one IP subnet that has to be advertised using routing protocols to other routes in the IP network. The amount of required public IP addresses in each IP subnet depends on how many IP hosts in the base station nodes has to be able to communicate with IP hosts connected to the base station external IP networks. Thus, the amount of addresses towards the external IP network increases quickly.

Therefore, there is a need for alternative ways of configuration of IP addresses.

SUMMARY OF THE INVENTION

Embodiments of the invention aim to address one or several of the above problems or issues.

In accordance with an aspect of the invention, there is provided a method for configuring addresses in a packet switched data communication system, the method comprising providing a logical network with at least two network elements, a network element comprising at least one sub-element, configuring a temporary address for an interface of a sub-element, retrieving an identifier of the network element and defining an address for the interface of the sub-element by including the identifier of the network element to the temporary address.

In accordance with another aspect of the invention, there is provided a network element comprising at least one sub-element, a configuring means adapted to configure a temporary address for an interface of a sub-element and to define an address for the interface of the sub-element by including an identifier of the network element retrieved by a retrieving means and the retrieving means adapted to retrieve the identifier of the network element.

In accordance with another aspect of the invention, there is provided a communication system comprising a logical network comprising at least two network elements, a network element comprising at least one sub-element, a configuring means adapted to configure a temporary address for an interface of a sub-element and to define an address for the interface of the sub-element by including an identifier of the network element retrieved by a retrieving means and the retrieving means adapted to retrieve the identifier of the network element.

BRIEF DESCRIPTION OF FIGURES

The invention will now be described in further detail, by way of example only, with reference to the following examples and accompanying drawings, in which.

DETAILED DESCRIPTION OF PREFERRED EMBODIMENTS

Embodiments of the present invention are described referring mainly to the base station node and 3GPP specifications, but the same idea may be implemented with any telecommunication equipment with similar characteristics as well.

In accordance with the embodiments of the invention, connecting multiple network elements comprising sub-elements to a single logical network, or subnetwork, is enabled. A single logical network may be, for example, a single logical LAN having only one IP router towards the external IP network. An example of a preferred embodiment may be connecting multiple base stations or base station nodes comprising base station modules to a single second layer (L2), i.e. link layer, switched network instead of connecting the base stations or base station nodes into separate IP subnetworks each connected via a separate IP router with the external IP network.

Connecting multiple base station nodes to the same logical LAN may be desirable, for example, for extending base station radio capacity by chaining two or more base station nodes into one logical base station system. In accordance with an embodiment, the base station nodes located physically close to each other may be bridged together using L2 switches. One of the base station nodes may become "Master", which has the IP router function for interconnection to the IP transport network. The other base station node(s) then become "Slaves" providing hardware and software for radio capacity extension.

Another example may be reducing the amount of routers in the IP transport network. For example, the OSPF protocol has limitations for the maximum number of routers in the routing areas. A group of base stations located close to each other may be interconnected using a bridged, i.e. L2 switched, transport solution. The interconnected base station nodes may serve, in some cases, as separate base station nodes or, in some cases, as a chained base station.

Figure 3:
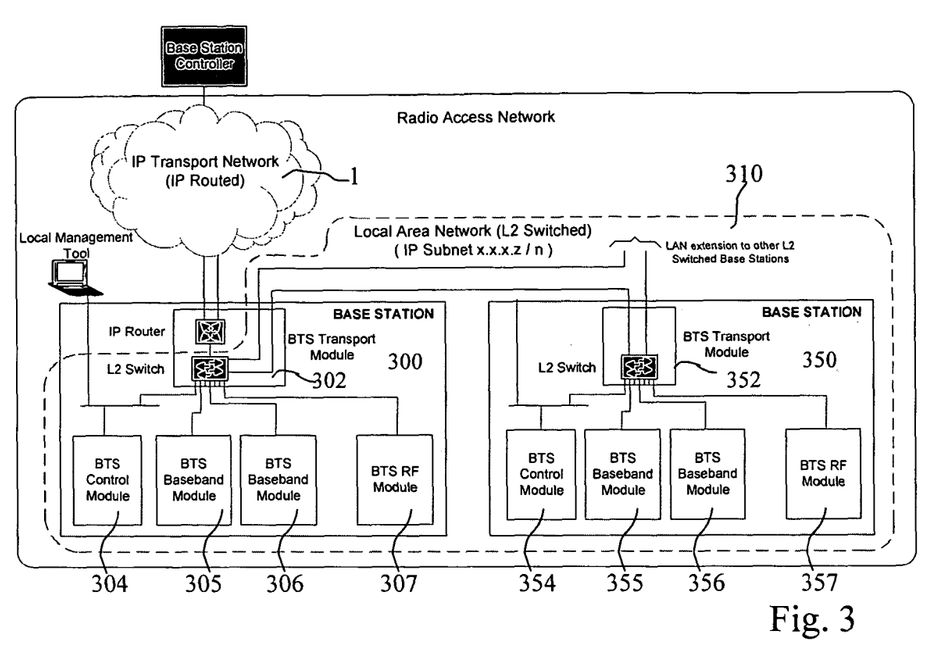
FIG. 3 shows multiple base stations connected to a logical network according to an embodiment of the invention.

An embodiment of the invention is shown in FIG. 3. In the FIG. 3 embodiment, two base station nodes 300, 350 are bridged together to form a logical network 310. The logical network 310 appears to the IP network 1 as one IP subnet. The base station nodes 300, 350 each comprise a base station control module 304, 354 and other base station modules, such as base station baseband modules 305, 306, 355, 356 and RF (radio frequency) modules 307, 357. The other base station modules 305, 306, 307, and respectively 355, 356, 357, should have some means to discover the correct base station control module 304, and respectively 354, residing in the same base station node 300, and respectively 350, in order to select the correct Cabinet ID to be used in the addresses of said other base station modules.

When multiple base stations are to be connected to the L2 switched network, all the base station modules 304-307 and 354-357 in base station nodes 300 and 350 can communicate with each other using just local-use IP addresses, such as IPv6 link-local or private IPv4 addresses. This is possible, because the base station modules are connected to the same logical LAN now.

In this kind of an environment, multiple base station nodes have to share the same IP subnet prefix. Now if the base stations create their link layer or IP addresses for the modules with node-local scope, for example, based on the module hardware position, the addresses in the base station nodes will overlap. It has now been found that an additional identifier for the base station node could be added in the addresses in order to create unique addresses within the scope of the shared IP subnet and logical LAN. In the examples below, the additional identifier identifying a base station node shall be called a Cabinet Identifier (Cabinet ID). The use of the Cabinet ID in the addresses guarantees the uniqueness of the module addresses in each base station node that is connected to the single logical network, such as the same logical L2 switched LAN. In order to keep the base station configurable with minimum effort, it may be desirable in certain embodiments to avoid introducing more manually configurable parameters. Thus, also the Cabinet ID should be autoconfigurable.

The logical Ethernet LAN 310 provides a location independent network from addressing point of view, i.e. nodes could be connected to any available physical interface of the LAN and they could use the same link layer and IP addresses for communications all the time. The only requirement for the used addresses is that they are unique within the scope of the LAN. The L2 switches (and bridges) maintain forwarding tables automatically based on ongoing traffic at link layer. The forwarding table binds the detected link layer addresses to ports (physical interfaces) of a L2 switch. Now in theory, it could be possible to resolve the topology of the LAN and the physical locations of the nodes with accuracy of a port just based on information in the forwarding tables. However, ordinary nodes of the network cannot, or are not allowed to access the contents of the forwarding tables from the L2 switches. Actually, if there is interface available for reading this information, it is usually limited to be accessed only via the network management system. Thus an ordinary node has no means for resolving its own, or other node's physical location in the topology of a L2 switched LAN.

In an embodiment, the base station modules are made capable of discovering automatically the Cabinet ID of the base station node, in which the modules are located physically. This discovery process can occur during the initial startup of the base station node, or during a "hot-insert" of a base station module, i.e. inserting a module into the base station node during its normal operation without switching off the power. Such a real-time discovery of the Cabinet ID must avoid using overlapping addresses even temporarily. Typically, during the initial base station startup, only the base station control module has access to the Cabinet ID information, which may, for example, be stored in a non-volatile memory of the base station control module. Thus, only the base station control module is capable of creating link layer address and IPv6 Interface ID so that the addresses contain unique Cabinet Identifier Information i.e. have wider scope than a single base station node. All the other base station modules must then resolve their physical location and Cabinet ID by discovering the correct base station control module over the Ethernet connections. The problem is that when multiple base station nodes are connected to the same logical L2 switched LAN, the base station modules would normally receive responses to their discovery messages from multiple base station nodes without being able to resolve automatically in which of the responding base station nodes the base station module itself is located physically.

The embodiments of the invention allow connecting multiple IP base station nodes to a L2 switched network without manual configuration of a Cabinet ID, link layer addresses (Ethernet MAC) and IP addresses into the base station modules in advance. Also the base station modules can be hot-inserted into an operational base station node without manual configuration in such environment.

In the embodiments of the invention, instead of using the usual globally unique Ethernet MAC addresses, the base station modules can use dynamically created addresses that are configured e.g. based on the hardware location information of a sub-element, such as the base station module, and including an identifier of the network element, such as the Cabinet ID. The dynamically created Ethernet MAC addresses need to be unique only within the scope of the local area network (LAN). Also the network layer IPv6 addresses can be derived from these dynamically created Ethernet MAC addresses as specified in the document RFC 2373 "IP Version 6 Addressing Architecture". The network layer IPv4 addresses can be configured automatically by using a dynamic host configuration protocol (DHCP) server that may be located in the IP Router of the root base station 300.

Figure 4:
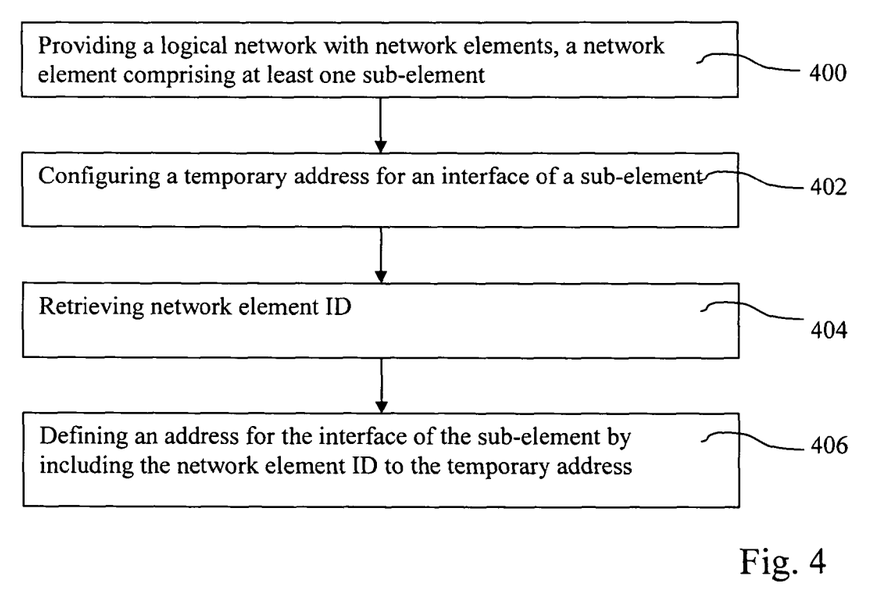
FIG. 4 is a flow chart illustrating an embodiment of the invention.

In general, the method embodying the invention may be used for any communication network element having an internal local network, which may become part of an external IP transport network. FIG. 4 shows the steps of an embodiment as a flow chart. In step 400, a logical network is provided with at least two network elements, wherein a network element comprises at least one sub-element. In step 402, a temporary address is configured for an interface of a sub-element. The address may be configured for the link layer, for example, based on the hardware location information of the sub-element in the network element or based on a module identifier of the sub-element. In step 404, an identifier of the network element is retrieved. In step 406, an address for the interface of the sub-element is defined by including the identifier of the network element to the temporary address.

Some embodiments of the invention will be described in the following by way of examples.

Figure 5A:
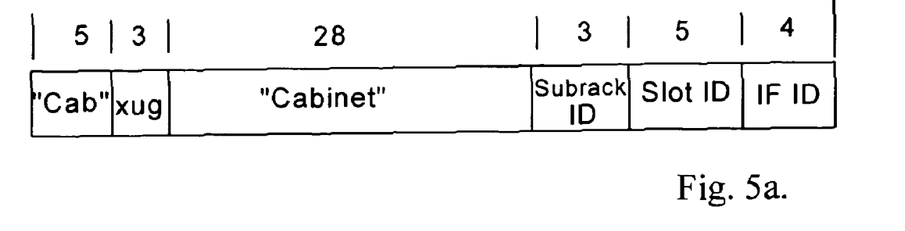
FIGS. 5a-5c show Ethernet and local-use address formats in the base stations according to an embodiment of the invention.
Figure 5B:
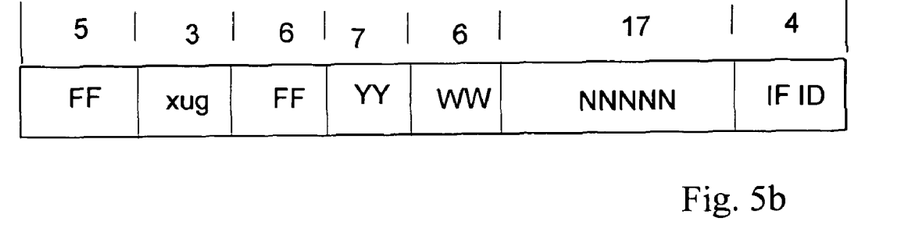
Figure 5C:
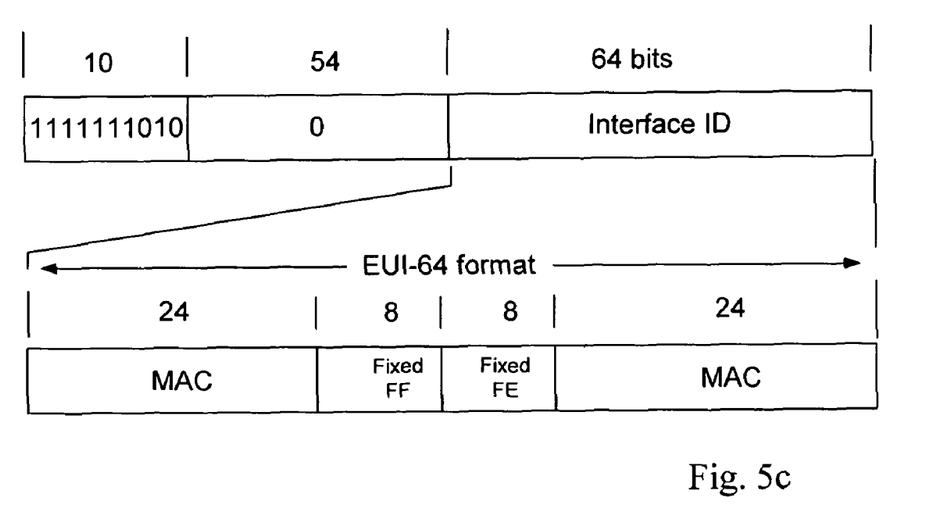

In an embodiment, the base station modules create dynamically the local-use addresses to be used for communications within the scope of the local area network, such as link layer (e.g. Ethernet) and network layer (e.g. link local IPv6) addresses, for example in the format illustrated in FIGS. 5a, 5b and 5c. Field lengths in FIGS. 5a, 5b and 5c are shown in bits. Each IP host in the base station modules assigns a link layer address that is unique at least inside the LAN that a base station node is going to build up. The link layer address (LLA), such as the 48-bit Ethernet MAC address is preferably based on hardware (HW) position information of the module when possible. Alternatively, for example if the module HW position information is not available or may otherwise not be used, the link layer address may be based on a serial number of the module.

FIG. 5a shows an example of a MAC address based on the HW position of the module. A factory loaded boot software of each processor is capable to create its own link layer address based on an identifier of the processor, such as a Processor ID (IF ID) inside the module, and on an identifier of the physical position ID that is readable automatically e.g. via I/O pins in the hardware of the node (such as a Subrack ID, Slot ID).

When the 48-bit MAC address is created based on module HW position, there may be, for example, 33 (i.e. 5+28) bits reserved for a Cabinet ID ("Cab" and "Cabinet" in FIG. 5a). The 12 last bits may be used for the Subrack ID, Slot ID, and IF ID. The xug bits are filled as follows: "x" defines address allocation method and may be 0 indicating a HW position case; "u" is a universal/local bit and may be 1 indicating local scope; and "g" is an individual/group bit and may be 0 indicating individual address. The "u" and "g" bits are typically defined by the Institute of Electrical and Electronics Engineers (IEEE). The "x" bit is proprietary.

FIG. 5b shows an example when the module is not able to read its position information and the serial number of the module may be used. The serial number of the module may, for example, consist of the following fields: FF is a factory symbol, YY is the production year (e.g. 0-99), WW is the production week (e.g. 01-52) and NNNN is a consecutive running reference number (e.g. 00001-99999). The xug bits may be set as in the above HW position embodiment except that the "x" bit is set to 1 to indicate that a serial number allocation method is concerned. If the module has several processors but only one serial number, the IF ID may be used to separate processors.

FIG. 5c shows an example of the structure of local-use addresses, so-called unicast link local IPv6 addresses, which are used inside the base station node. The addresses shall begin with a binary prefix 1111111010 and comprise a 64-bit interface ID portion. The interface ID may be used by the base station modules for internal communication and for communication towards the router. The base station modules may generate the interface ID according to the document RFC2464 "Transmission of IPv6 Packets over Ethernet Networks" based on the EUI-64 identifier. This means that the 48-bit MAC address is taken as the basis and fixed value FFFE is added in the middle. It is to be noted that, when creating the interface ID, the "u" bit is inverted to 1 in the address to indicate universal scope.

The nodes that are addressed link-locally, are able to communicate with neighbors in the same link (e.g. Ethernet LAN) through this addressing scheme. It is to be noted that routers do not forward any packets with link-local source or destination addresses to other links. The IPv6 link local addressing and stateless address configuration may ensure that a BTS node is capable of establishing internal communication between all the modules without any manual configuration. Following from the above, the interface ID is allocated based on the HW address of the module, such as the HW position, or based on module's unique serial number. This allocation mechanism allows every host to obtain a unique IP address without fear of overlapping addresses.

Link Layer Addresses

The dynamic creation of the link layer addresses may be based on the IEEE 48-bit MAC Identifier format as defined by the IEEE.

The 48-bit MAC Identifiers may have the "universal/local" and "individual/group" bits set fixed to zeroes in order to limit the scope of the addresses to a local use, and to provide unicast type addresses for the interfaces. As the scope of the addresses is local, the 48-bit MAC Identifiers need not to apply officially assigned "company id" bits (c-bits) i.e. these bits can be used freely also for other purposes e.g. for the most significant bits (MSBs) of the Cabinet ID information as in the example address that is shown in FIGS. 5a-5c.

The contents of the manufacturer selected extension identifier (24 least significant bits (LSBs), known as "m-bits") may be derived from the HW position (Interface ID, Slot Position and Rack Position) and Cabinet ID information. In an alternative embodiment, for example if the HW position information is not available, the bits for this field may be derived from a module identifier, e.g. from the module serial number.

Link-Local IPv6 Addresses

All the base station modules shall create dynamically their link-local IPv6 addresses based on the EUI-64 identifier that is derived from the IEEE 48-bit MAC Identifier. The creation of link-local IPv6 address is specified in the document RFC 2373 "IP Version 6 Addressing Architecture".

The base station Control Module shall assign also a "well known" link-local IPv6 address for its OA&M (Operations, Administration & Maintenance) interface that will be used for the Cabinet ID discovery purposes. This address can be in principle any link-local IPv6 address that is reserved only for this purpose.

Considerations for Address Autoconfiguration in a L2 switched network.

Referring back to FIG. 3, an example of an arrangement of multiple base stations in a L2 switched network is shown. Multiple IP base station nodes 300, 350 are connected to a L2 switched LAN 310. The logical network 310 extends thus to cover multiple base station nodes 300, 350 each representing their own LAN segment. In the embodiment of this invention, it is assumed that the L2 switches in the base station transport modules 302 and 352 are capable to support VLAN (Virtual LAN) according to IEEE 802.1Q specification "Virtual Bridged Local Area Networks".

The base station address autoconfiguration during the initial startup will work without overlapping address problems in a L2 switched network 310 if the following conditions are met. The reference numerals used below refer only to the base station node 300, i.e. one of the LAN segments. This is done for clarity. The same conditions apply for the other base station node 350, or other base station nodes, in order to autoconfigurate the whole logical network, i.e. the L2 switched LAN 310.

1. A base station transport module 302 included in the base station node 300 does not enable the external interfaces of the base station transport module 302 if no valid configuration data (e.g. commissioning file) has been received. Only exception is a local management port which interface is required for connecting a local management tool. The local management tool may be used to access the base station control module and the transport module via the base station internal LAN in order to configure them, when the IP router and L2 switch are not yet configured. Now communication in a non-configured base station is possible only within the internal LAN of the base station node 300.

2. When the base station transport module 302 has received valid configuration data (e.g. using the local management tool), the valid configuration data contains, among other parameters, filtering settings for the boundary port(s) of the L2 switch in order to block all the Ethernet frames that contain a destination (DST) address in which the bits defined for Cabinet ID are zeroes. Now the base station node forms a VLAN zone with a private link layer address space. Based on the received configuration data, the base station transport module 302 shall also enable the boundary ports in the L2 switch physical interfaces in order to allow extending the L2 switched local area network 310 outside the base station node 300, such as connecting more L2 switched devices to the LAN.

3. The base station control module 304 may assign a predetermined "well-known" link-local IPv4 and IPv6 addresses for its OA&M interface. These addresses may be used temporarily for Cabinet ID discovery (location detection) by the other base station modules 305, 306, 307.

4. The other base station modules 305, 306, 307 assign a temporary link layer address (Ethernet MAC Identifier) from the private link layer address space (Cabinet ID bits are zeroes) during initial startup that shall be used only for Cabinet ID discovery.

The second of the above conditions has to be met in the base station transport module 302 because the IP hosts of the base station modules 305, 306, 307 must perform Cabinet ID discovery with their network interface configured for temporary link layer addresses in which Cabinet ID bits are not set. Otherwise there will be overlapping address problem during hot inserts of modules i.e. during normal operation of a base station node when traffic is enabled via the boundary ports of the L2 switch. The possibility of setting filters in L2 switches is a standard feature where the VLAN bridges may filter frames in order to localize traffic in the Virtual Bridged LAN. The configuration of static filtering entries or static VLAN registration entries in a filtering database disallows the forwarding of frames with particular destination addresses or VLAN classifications on specific ports.

Base Station Control Module IPv6 Address Autoconfiguration

It is assumed that the base station control module can access the Cabinet ID information by some other means than using the Ethernet links for physical access. Thus, only the base station control module is able to create its complete link layer and IPv6 link-local addresses without performing the Cabinet ID discovery procedure.

When the base station is powered up, all the hosts shall start up in parallel. All the IPv6 hosts shall perform a IPv6 duplicate address detection (DAD) procedure when they initialize their network interface as will be explained more in detail below. However, the other hosts than the control module cannot complete their IPv6 address autoconfiguration scenario before the control module has configured its network interface and is thus able to respond to the messages from the other base station hosts.

Figure 6:
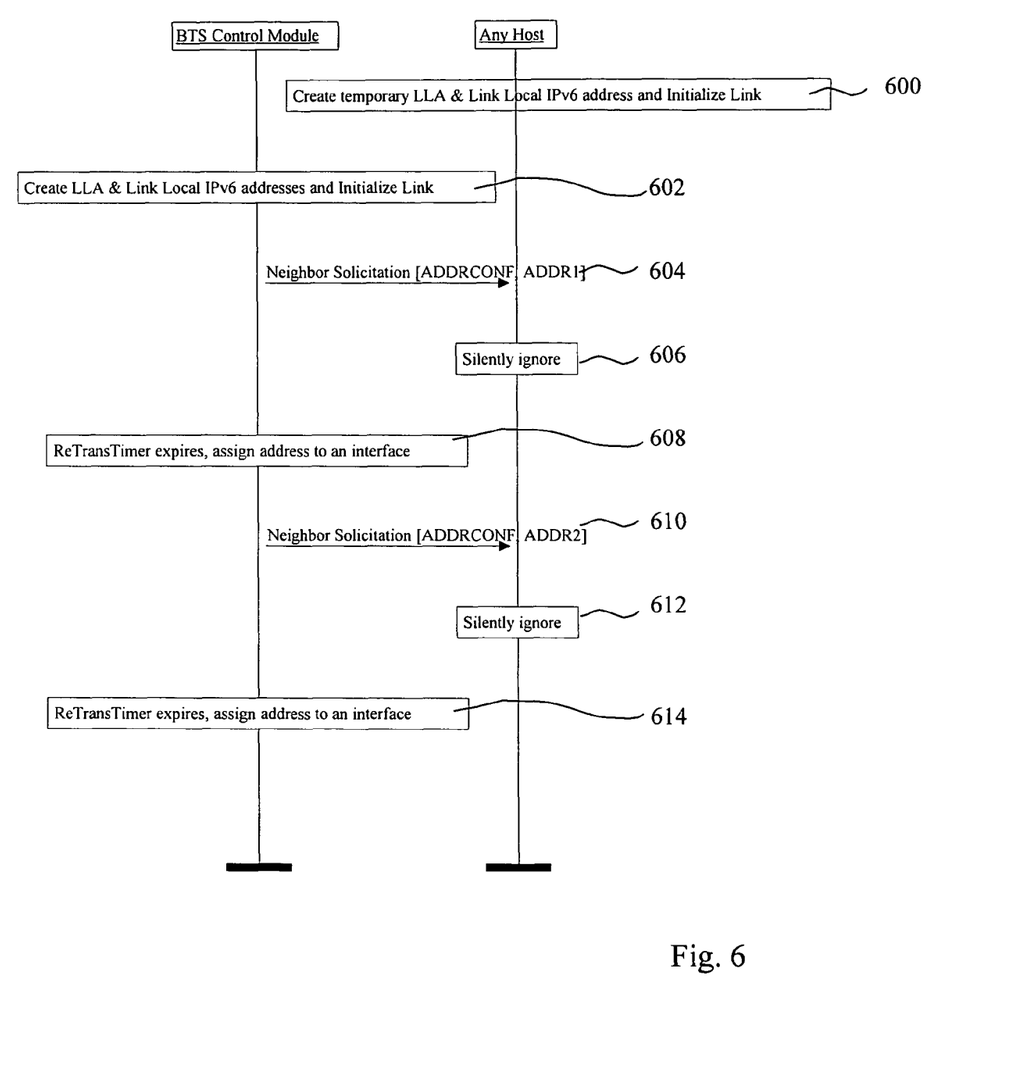
FIG. 6 shows an example of the BTS control module IPv6 address autoconfiguration procedure according to an embodiment.

The diagram in FIG. 6 shows how the base station control module may create and validate its addresses. In sequence 600, a host in the base station ("any host") creates and assigns temporary addresses for its interface and initializes its interface to the link. In sequence 602, the base station control module creates and assigns addresses for its interface and initializes its interface to the link. Following addresses may be assigned: link layer address (LLA), such as the Ethernet MAC, based on module HW position and Cabinet ID information, base station control module link-local IPv6 address (ADDR1) in which the interface ID part of an IPv6 address may be derived from the Ethernet MAC address using EUI-64 format, and base station OA&M "well known" link-local IPv6 address (ADDR2) that does not overlap with the addresses that are derived from the Ethernet MAC addresses. After the interface initialization, the base station control module may verify the tentative addresses, for example, by performing a standard IPv6 duplicate address detection (DAD) scenario for the both tentative addresses, sequences 604, 608, 610, 614.

The DAD procedure may be done according to a procedure defined in the document RFC 2462 "IPv6 Stateless Address Autoconfiguration" as follows:

Before sending a neighbor solicitation, sequences 604, 610, the base station control module's interface joins the all-nodes multicast address and the solicited-node multicast address of the tentative address.

To check an address, the base station control module sends neighbor solicitation messages, sequences 604, 610. The solicitation's Target Address is set to the address being checked, the IP source is set to the unspecified address and the IP destination is set to the solicited-node multicast address of the target address.

On receiving Neighbor Solicitation any host will process the message as follows: if the target address is tentative, and the source address is a unicast address, the solicitation's sender is performing address resolution on the target; the solicitation should be silently ignored, sequences 606, 612.

If the base station control module does not receive any replies (neighbor advertisements) to neighbor solicitations within certain time, it is sure that the checked address is not used by some other node connected to the same link.

After successful DAD procedures, the base station control module assigns IP addresses to its interface, sequences 608, 614, as now these addresses (ADDR1 and ADDR2) can be determined to be unique. Now the base station control module is able to send packets via its interface and respond to address resolutions from the other hosts in the network, such as the other base station modules.

Any Base Station Host IPv6 Address Autoconfiguration

Figure 7:
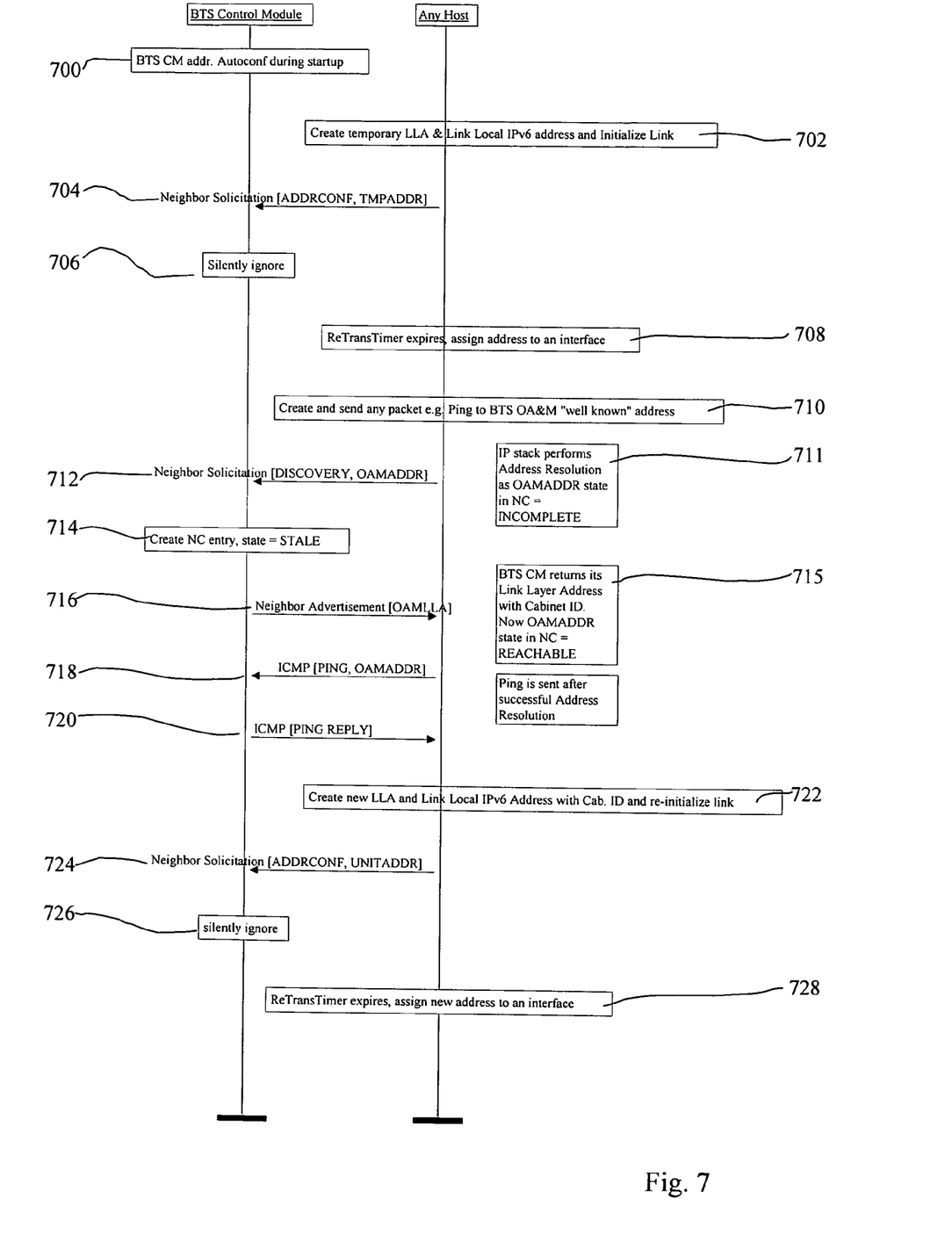
FIG. 7 shows an example of another BTS module IPv6 address autoconfiguration procedure according to an embodiment making use of the result from the FIG. 6 embodiment.

During the startup the IP hosts in modules other than the base station control module cannot access them selves the Cabinet ID information. Thus a method is defined in the following for retrieving the Cabinet ID information from the base station control module. The method may be carried out without using any higher application level messaging i.e. the procedure may be able to run in a bootstrap code of the module software. The sequence diagram of FIG. 7 shows how all the other base station hosts can retrieve Cabinet ID from the base station control module and create and validate their addresses. In sequence 700, the base station control module autoconfigures its link layer and IPv6 addresses first during the startup. The procedure may be the following:

In sequence 702, the base station host creates the temporary addresses for its interface:

Link layer Address (Ethernet MAC), for example based on the HW position of the module in the base station node or derived from the module serial number, except that the bits reserved for the Cabinet ID are set to zeroes; and Host Link Local IPv6 Address in which Interface ID part is derived from the temporary Ethernet MAC address.

Sequence 702 continues by the base station host initializing its interface. In sequences 704, 706, the base station host performs standard IPv6 DAD scenario for its temporary and "tentative address" according to RFC 2462 in similar manner as the base station control module did for its interface.

After successful DAD, in sequence 708 the base station host assigns the temporary IP address to its interface as now it can be determined to be unique. Now the base station host is able to send packets using this temporary and "validated" IP address to other hosts via its interface.

Next, in sequences 710-720, the base station host may perform an address resolution procedure for the BTS OA&M's "well known" IP address according to RFC 2461 "Neighbor Discovery for IP Version 6" in order to retrieve the base station control module's link layer address that is supposed to contain the Cabinet ID information. According to RFC 2461 "Neighbor Discovery for IP Version 6 (IPv6)":

Address resolution is the process through which a node determines the link layer address of a neighbor given only its IP address.

When a node has a unicast packet to send to a neighbor, but does not know the neighbor's link layer address, it performs address resolution.

1. A standard way to trigger the address resolution procedure is to send some IP packet, such as a ping packet, to a neighbor for which the IP address is known. In an embodiment, a ping packet may be sent to the base station OA&M's "well known" address (sequence 710). When the packet is sent from application layer, it may queue in an IP stack that creates a neighbor cache entry in an incomplete state (sequence 711) and transmits a neighbor solicitation message (sequence 712) targeted to a neighbor, which in this embodiment is the base station control module. The neighbor solicitation message for address resolution shall have the following contents:

Link Layer Addresses:
Source LLA=base station host's temporary link layer address (MAC address where Cabinet ID bits are zeroes)
Destination LLA="all nodes" (broadcast). It does not matter if "all nodes" address is used because the reply from external base station OA&M(s) will be filtered in the base station transport module.

IP Fields:
Source address: base station host's temporary link local IPv6 address (Cabinet ID bits are zeroes in the Interface ID of the IPV6 address)
Destination address: The "well known" base station OA&M's link local IPv6 address ICMP Fields:
Target address: The "well known" base station OA&M's IP address Source link layer address (optional): base station host's temporary link layer address (MAC address where Cabinet ID bits are zeroes)

The receiving base station control module processes the neighbor solicitation message as follows (sequence 714):

If the source address is not an unspecified address and, on link layers that have addresses, the solicitation includes a source link layer address option, then the recipient may create or update the neighbor cache entry for the IP source address of the solicitation. If an entry does not already exist, the node may create a new entry and set its reachability state to "stale".

After any updates to the neighbor cache, the node, which in this embodiment is the base station control module that has assigned the base station OA&M's "well known" IP address to its network interface, sends a neighbor advertisement response as described in the following (sequence 716):

A node sends a neighbor advertisement in response to a valid neighbor solicitation targeting one of the node's assigned addresses. The target address of the advertisement is copied from the target address of the solicitation. If the solicitation's IP destination address is not a multicast address, the target link layer address option may be omitted. This is because the neighboring node's cached value must already be current in order for the solicitation to have been received. If the solicitation's IP destination address is a multicast address, the target link layer option is included in the advertisement. Furthermore, if the node is a router, the router flag is set to one. Otherwise, the node sets the flag to zero.

The contents of the neighbor advertisement reply message from the base station control module shall be as follows:

Link Layer Addresses:
  Source LLA=base station control module's link layer address (MAC address where Cabinet ID bits are set accordingly)
  Destination LLA=base station host's temporary link layer address (MAC address where Cabinet ID bits are zeroes). The base station transport module will block the reply messages from the external nodes, so only the reply from the local base station control module of the base station node will be received by the requesting host.

IP Fields:
  Source Address: The "well known" base station OA&M's IP address
  Destination Address: base station host's temporary link local IPv6 address (Cabinet ID bits are zeroes in the Interface ID of the IPV6 address)

ICMP Fields:
  R Router flag=0 (the base station control module is a host)
  S Solicited flag=1 indicating that the advertisement was sent in response to a neighbor solicitation
  O Override flag=1 indicating that the advertisement should override an existing cache entry and update the cached link layer address
  Target Address: The "well known" base station OA&M's IP address i.e. same as the Target Address Field in the previous Neighbor Solicitation message
  Target link layer address option: The base station control module's link layer address in which the Cabinet ID bits are set accordingly (the receiving node's IP stack shall insert this value in the cache).

When a neighbor advertisement response is received in the base station host, its contents, including the link layer address is stored into the neighbor cache, neighbor is marked with a status "reachable" (sequence 715) and the queued ping packet is transmitted (sequence 718). It should be noted that the neighbor solicitation message 712 might be received in all base station control modules in other base station nodes that are connected to the same L2 switched network. However, in this case the base station host shall receive just one neighbor advertisement response from the local base station control module as the responses from the other base station nodes that are targeted to temporary link layer addresses (with Cabinet ID bits zeroes) will be blocked in the L2 switch of the base station transport module.

The base station control module will reply to the ping (sequence 720). In this embodiment, the Cabinet ID information is now available in the link layer address (LLA) field of the neighbor cache entry for the base station OA&M's "well known" address. In sequence 722, the host reads the LLA from the neighbor cache, resolves the Cabinet ID and updates its addresses accordingly and initializes its Ethernet Interface and IP stack with new tentative addresses. The address is tentative until its uniqueness is verified. In sequences 724, 726, the host performs a duplicate address detection (DAD) for its new IP address according to RFC 2462. After a successful DAD procedure, in sequence 728, the host validates its final IP address in which also the Cabinet ID bits are set accordingly.

Now the base station host is able to start communicating at application level with other hosts in the network using its link layer and IPv6 Link Local Addresses that are unique within the scope of the L2 switched network.

It is to be noticed that the above presented scenario describes an example of a successful address configuration case. For example, if the base station control module has not completed its address autoconfiguration procedure, the "any hosts" should repeat the steps 710-712 until a response is received. In an embodiment, the IP stack may give indication to the upper layers, such as "Destination is unreachable".

Considerations for a Base Station Module Hot Insert in a L2 Switched Network.

When a new base station module is hot inserted into a base station node, which is connected to a L2 switched network with multiple base station nodes, it must discover its local base station control module in order to register itself to its correct "Master" and to autoconfigure unique addresses within the scope of the L2 switched network with the correct Cabinet ID correspondingly.

The new hot inserted base station module may apply the same "Any base station IPv6 Host Address Autoconfiguration" procedure as it is described earlier for the initial base station node startup when the following conditions are met:

1. The base station control module has assigned for itself a base station OA&M "well known" link local IPv6 address that is known by all the base station modules (hard coded).
2. The scope of the link layer addresses (MAC) with Cabinet ID bits being zero is limited to cover only the local LAN segment of the base station node i.e. a VLAN zone is configured into the L2 switch of the base station transport module.
3. A new hot inserted base station module discovers its local base station control module using the base station OA&M's "well known" link local IPv6 address. An address resolution procedure is performed such that a new base station module sends an unicast solicitation for requesting the link layer address of the local base station control module (Ethernet MAC) that is supposed to include the Cabinet ID information.

As the result of the successful "Any base station IPv6 Host Address Autoconfiguration" procedure", the hot-inserted base station module has discovered its controlling base station control module, the cabinet in which it is located physically, and is able to communicate using the unique IPv6 link local addresses within the scope of the L2 switched network.

Basic Scenario for IPv4 Address Autoconfiguration During the 1st Base Station Startup In an embodiment, the base station module may be adapted to the IPv4 instead of IPv6. The base station modules that will become IPv4 hosts preferably assign their IPv4 addresses using the DHCP. This is because IPv4 addressing allows connecting only a limited amount of hosts in bne IP subnet and only the DCHP provides means for managing the preconfigured addresses in the IP subnet. Now It is important to assign unique link layer addresses (MAC) in each base station host to be unique within the scope of the L2 switched network, as the IPv4 addresses can no longer be created using the same rules as in the IPv6 case.

The L2 switched LAN that comprises of one IP subnet should contain a DHCP server that may be located at the base station transport module that provides an IP router function i.e. the base station transport module 302 of the "root" base station node 300 in FIG. 3.

When the base station transport module 302 has not received its configuration data, the DHCP server may be started using a pool of private IPv4 addresses on default (e.g. 192.168.255.01-192.168.255.15).

When the base station transport module has received the configuration data, the DHCP server can be configured to have another pool of public IPv4 addresses (or addresses from another private range e.g. 10.x.x.x) reserved for the hosts in this IP subnet according to a detailed IP network plan. As the host ID portion of an IPv4 address is only few bits long, they cannot be assigned based on the same rules as in the 64-bit long interface IDs of IPv6 addresses. Thus, all the IPv4 hosts, including the base station control modules, will get their IP addresses from the DHCP server based on rules configured in the DHCP server.

Any Base Station Host IPv4 Address Autoconfiguration

In order to avoid overlapping link layer addresses, the host's link layer address (Ethernet MAC Identifier) is assigned using the same rules as in the IPv6 case.

Now the other base station modules than the base station control module should receive the link layer address of its local base station control module in order to resolve the Cabinet ID. This link layer address can be resolved by using a "well known" IPv4 address for the base station OA&M function, which in this embodiment is a private IPv4 address.

In IPv4, all the hosts, including the base station control module, may assign their IPv4 addresses using a standard DHCP procedure. The other base station modules may use the address resolution protocol (ARP) for discovering the cabinet ID bits to be used in the link layer addresses. This is explained in detail in the following.

Figure 8:
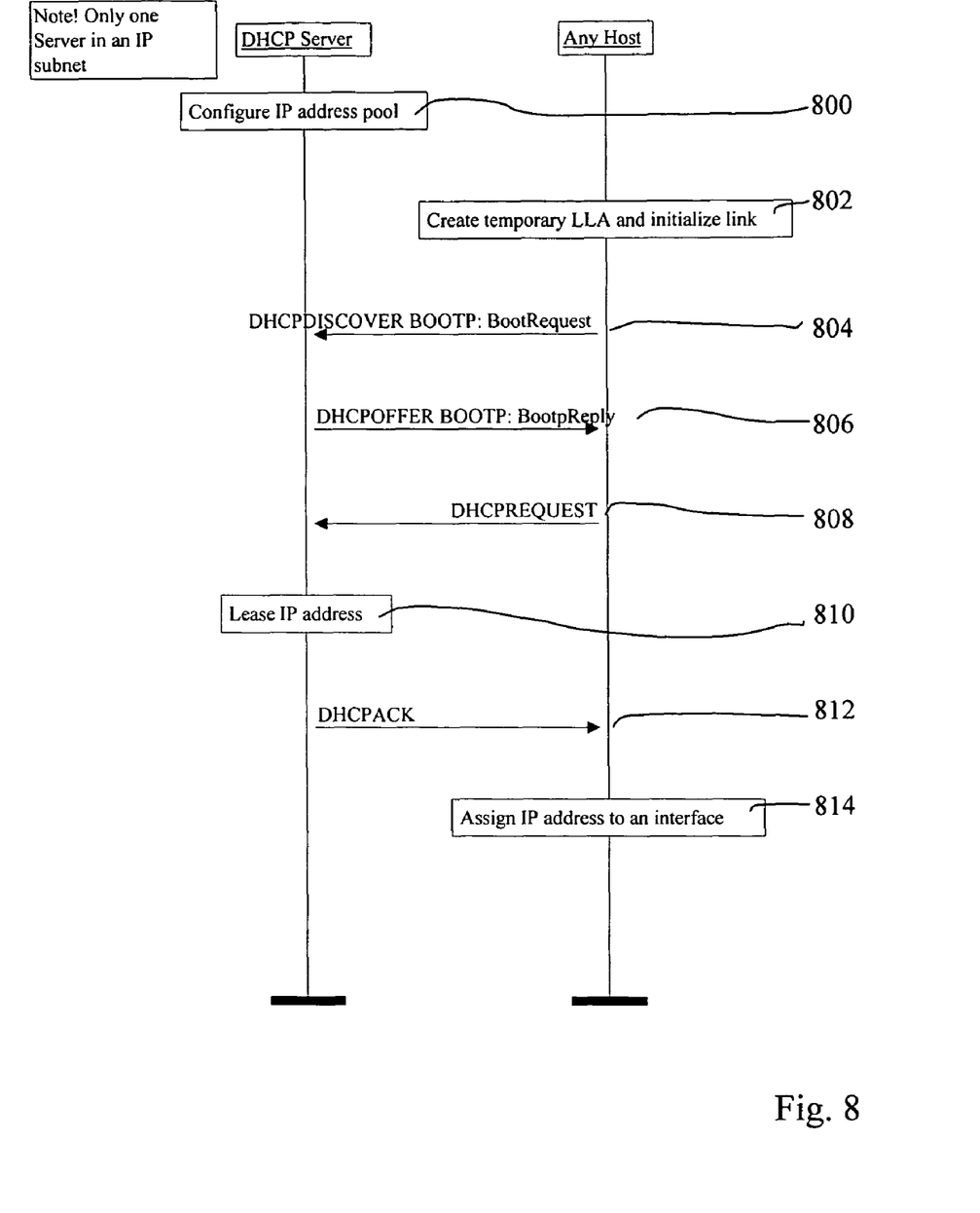
FIG. 8 shows an example of a BTS module IPv4 address autoconfiguration procedure according to a further embodiment.

The diagram of FIG. 8 shows an IPv4 address autoconfiguration scenario using the DHCP in accordance with the document RFC2131 "Dynamic Host Configuration Protocol":

A DHCP server configures an IP address pool, in sequence 800. In sequence 802, an IPv4 module ("any host") may create a temporary LLA based on the module HW position information in which the bits reserved for the Cabinet ID are zeroes in a similar way as in the IPv6 case. The modules that cannot detect their physical location are an exception. Their temporary LLA may be derived from the module serial number, instead of using the HW position (lowest order bits), and including the Cabinet ID bits that are zeroes.

The any host makes a boot request (sequence 804) and gets a boot reply (sequence 806) from the DHCP server. In sequence 808, the any host sends a DHCP request. The DHCP server leasing the IP address to the requesting host may store the IP address in the non-volatile memory of the DHCP server. The IP address is sent to the any host, in sequence 812, and the IP address is assigned to an interface of the any host, in sequence 814. In the subsequent restarts, the any host may assign the same IP address for its interface unless it detects that it is placed in a different HW position or in a different base station node.

When the base station module "any host" has assigned its IPv4 address, it discovers the link layer address of the local base station control module in order to obtain the Cabinet ID information.

Figure 9:
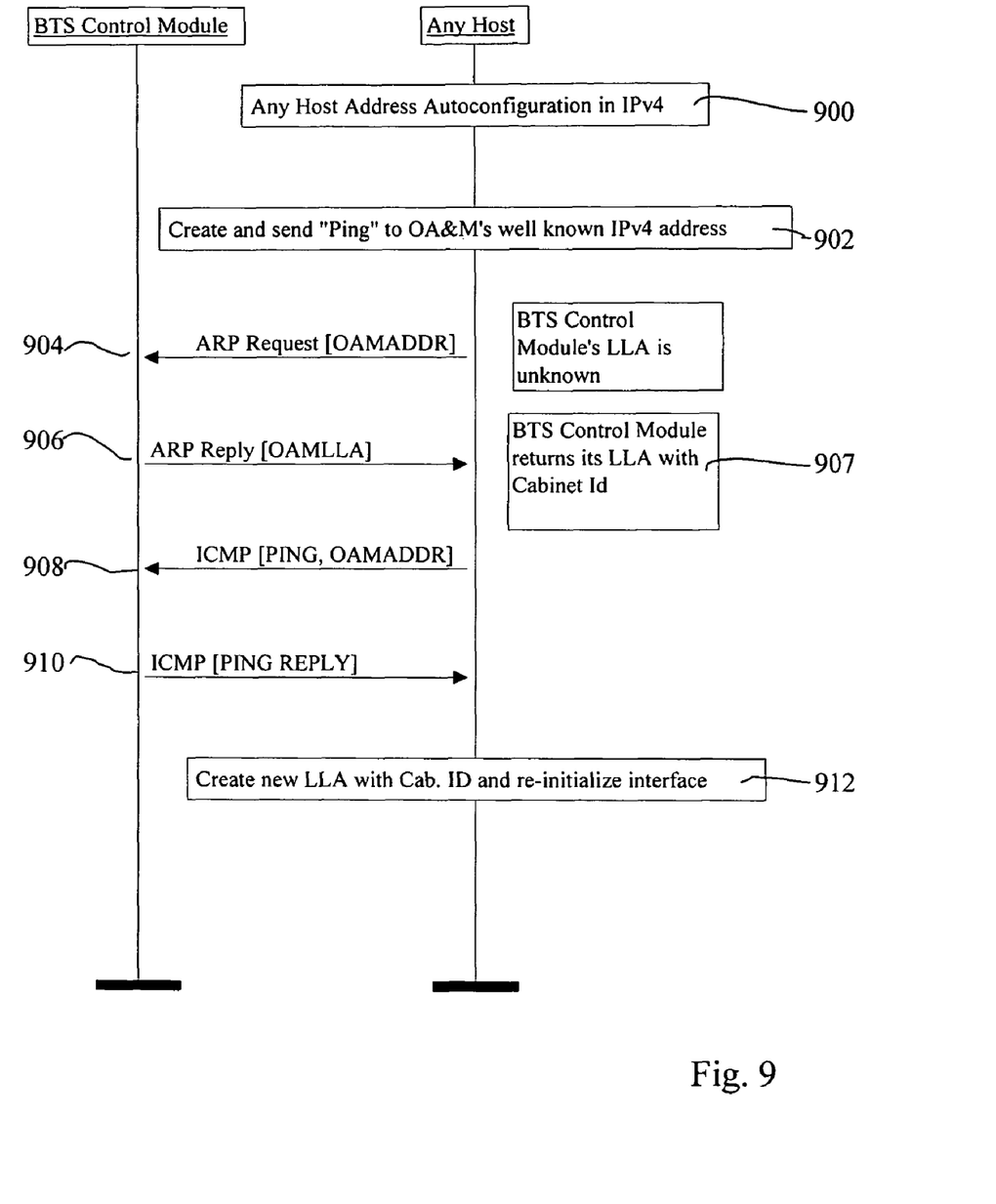
FIG. 9 shows an example of discovery of the node information according to an embodiment making use of the result from the FIG. 8 embodiment.

In IPv4 the "Address Resolution Protocol" (ARP) described in the document RFC 826 "An Ethernet Address Resolution Protocol" can be used to resolve the link layer address of another host when its IPv4 address is known. The ARP scenario illustrated in FIG. 9 is analogous with IPv6 address resolution procedure.

The base station host can initiate an address resolution procedure (sequence 900) by sending e.g. a ping packet to base station OA&M's "well known" IPv4 address (sequence 902).

As a result of the ARP procedure (sequences 904, 906), the base station control module's LLA with Cabinet ID information can be read from the ARP table of the host's IP stack (sequence 907).

The queued ping request is transmitted to the base station control module (sequence 908). While a reply to the ping is received from base station control module (sequence 910), the any base station module shall create its permanent link layer address in which the bits reserved for the Cabinet ID are set accordingly (sequence 912). When the ARP is completed, the base station module "any host" re-initializes its interface using this new LLA and the IPv4 address that was assigned earlier using the DHCP.

Now the base station module "any host" is able to start communicating at an application level with the other hosts in the base station using its unique LLA and IPv4 addresses within the scope of the L2 switched network.

Based on the above, an embodiment of the invention may be summarized as follows. An ARP request in an "any host" is sent by using a temporary link layer address (LLA) in which the bits reserved for the Cabined ID are zeroes. If there are multiple base station nodes connected to the L2 switched network, all the base station control modules will receive this ARP request (broadcast message) and they will respond with an ARP reply. However, in the ARP reply message, the destination address at the link layer, i.e. in the Ethernet frame, is the temporary LLA of the "any host" having zeroes in the predefined Cabinet ID bits. Thus, the L2 switch of the transport module, which is set to block the Ethernet frames with a LLA having zeroes in the Cabinet ID bits from the boundary ports of the transport module, will block the frame, i.e. discards it. This means that the "any host" will receive the ARP reply only from its local base station control module located physically inside a boundary set in the L2 switch. In this way, the "any host" is able to discover its master, i.e. the local base station control module in the same base station node with the "any host", and to resolve the Cabinet ID.

Although the invention has been described in the context of particular embodiments, there are several variations and modifications which may be made to the disclosed solution without departing from the scope of the present invention as defined in the appended claims. For example, the method of the invention may be used for any other telecommunication equipment having an internal local network, which may become part of an IP transport network. Base station has been used herein only for illustrative purposes and for the simplicity of the presentation.

The invention claimed is:

1. A method for configuring addresses in a packet switched data communication system, the method comprising:
   configuring at a network element a first address for an interface of a sub-element of the network element, the network element comprising a control module and the sub-element, wherein the first address is valid in an internal network associated with the network element;
   retrieving an identifier of the network element from the control module; and
   defining a second address for the interface of the sub-element based on the retrieved identifier of the network element and the first address, wherein the second address is valid in an external network with which the network element communicates.

2. The method according to claim 1, wherein the first address is a local link layer address for the interface of the sub-element.

3. The method according to claim 1, wherein the first address for the interface of the sub-element is configured based on the position of the sub-element in the network element.

4. The method according to claim 1, wherein the first address for the interface of the sub-element is configured based on a serial number of the sub-element.

5. The method according to claim 1, wherein the control module is configured to access the identifier of the network element without communicating with other network elements.

6. The method according to claim 5, wherein the control module is configured to store the identifier of the network element in a memory of the control module.

7. The method according to claim 1, further comprising verifying the uniqueness of the second address using a duplicate address detection process.

8. The method according to claim 1, wherein the identifier of the network element is retrieved from the control module using the first address as a unique address to carry out an automatic address resolution procedure locally in the network element.

9. The method according to claim 1, wherein the defined second address comprises a network layer address for the interface of the sub-element.

10. The method according to claim 1, further comprising blocking, inside the network element, all data packets that do not contain the identifier of the network element.

11. The method according to claim 1, further comprising enabling the interface of the sub-element for network element external communication after the second address for the interface of the sub-element is defined.

12. The method according to claim 1, further comprising retrieving a network portion identifying a logical network including the network portion with the second address of the interface of the sub-element.

13. The method according to claim 12, wherein the logical network is a layer 2 switched local area network with at least two network elements.

14. A network element comprising:
a sub-element;
a control module;
a processor; and
a computer-readable memory operably coupled to the processor, the computer-readable memory comprising instructions that, if executed by the processor, cause the network element to perform operations comprising:
configuring a first address for an interface of the sub-element, wherein the first address is valid in an internal network associated with the network element;
retrieving-an identifier of the network element from the control module; and
defining a second address for the interface of the sub-element based on the retrieved identifier of the network element and the first address, wherein the second address is valid in an external network with which the network element communicates.

15. The network element according to claim 14, wherein the first address is a local link layer address for the interface of the sub-element.

16. The network element according to claim 14, wherein the first address is configured based on the position of the sub-element in the network element.

17. The network element according to claim 14, wherein the first address is configured based on a serial number of the sub-element.

18. The network element according to claim 14, wherein the control module is configured to access the identifier of the network element without communicating with other network elements.

19. The network element according to claim 18, wherein the control module is configured to store the identifier of the network element.

20. The network element according to claim 18, wherein the operations further comprise verifying the uniqueness of the second address using a duplicate address detection process.

21. The network element according to claim 14, wherein the identifier is retrieved from the control module of the network element using the first address as a unique address to carry out an automatic address resolution procedure locally in the network element.

22. The network element according to claim 14, wherein the defined second address comprises a network layer address for the interface of the sub-element.

23. The network element according to claim 14, wherein the operations further comprise blocking, inside the network element, all data packets that do not contain the identifier of the network element.

24. The network element according to claim 14, wherein the operations further comprise retrieving a network portion identifying a logical network and including the network portion with the second address of the interface of the sub-element.

25. The A network element according to claim 15, wherein the local link layer address is based on a 48-bit media access control identifier format.

26. The network element according to claim 22, wherein the network layer address is one of a link-local Internet Protocol version 6 address based on an EUI-64 identifier and an Internet Protocol version 4 address using a dynamic host configuration protocol.

27. The network element according to claim 14, wherein the network element is a transceiver.

28. A communication system comprising:
a logical network comprising at least two network elements, a network element of the at least two network elements comprising at least one sub-element and a control module; and
a configuring means for configuring a first address for an interface of a sub-element of the at least one sub-element, wherein the first address is valid in an internal network associated with the network element, and for defining a second address for the interface of the sub-element based on an identifier of the network element retrieved from the control module and the first address, wherein the second address is valid in an external network with which the network element communicates.

29. The communication system according to claim 28, wherein the defined address further comprises a network portion identifying the logical network.

30. The communication system according to claim 28, wherein the second address comprises one of a link-local Internet Protocol version 6 address based on an EUI-64 identifier and an Internet Protocol version 4 address using a dynamic host configuration protocol.

31. The communication system according to claim 29, wherein the first address is based on a 48-bit media access control identifier format.

* * * * *

UNITED STATES PATENT AND TRADEMARK OFFICE
CERTIFICATE OF CORRECTION

| | | |
|---|---|---|
| PATENT NO. | : 7,974,311 B2 | Page 1 of 1 |
| APPLICATION NO. | : 10/774576 | |
| DATED | : July 5, 2011 | |
| INVENTOR(S) | : Vesterinen et al. | |

It is certified that error appears in the above-identified patent and that said Letters Patent is hereby corrected as shown below:

Column 17, line 43, in Claim 14, delete "retrieving-an" and insert -- retrieving an --.

Column 18, line 25, in Claim 25, delete "The A" and insert -- The --.

Signed and Sealed this
Sixth Day of December, 2011

David J. Kappos
*Director of the United States Patent and Trademark Office*